April 7, 1959  H. E. MILLS  2,880,547
LINE-ATTACHING CLIP FOR A FISHING FLOAT
Filed Aug. 19, 1957
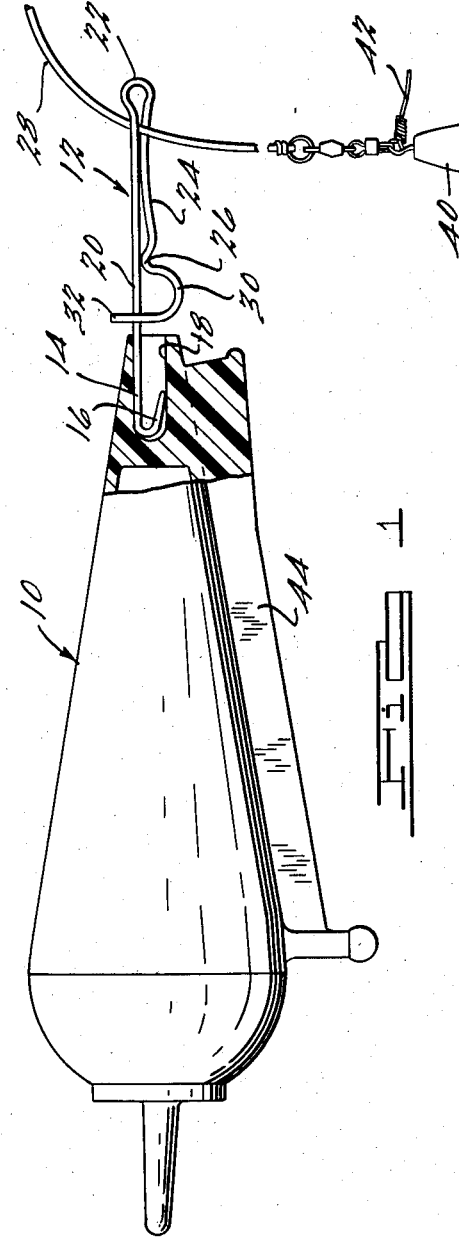
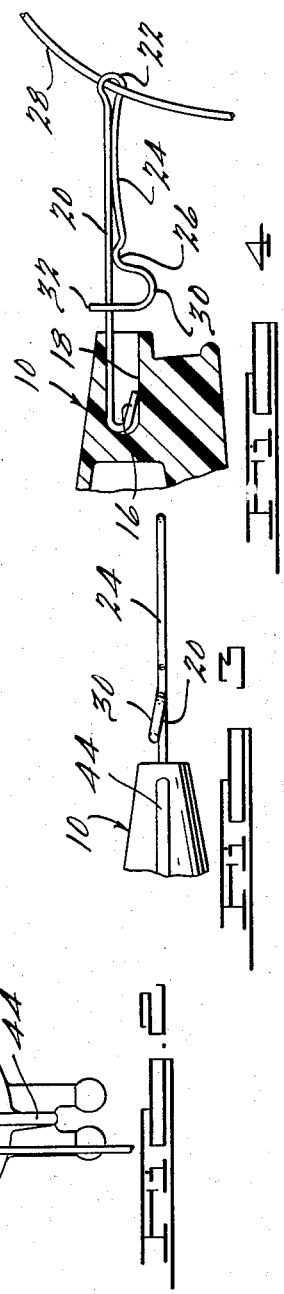
INVENTOR.
Herbert E. Mills.
BY
Balluff & McKinley
ATTORNEYS.

United States Patent Office 2,880,547
Patented Apr. 7, 1959

2,880,547

LINE-ATTACHING CLIP FOR A FISHING FLOAT

Herbert E. Mills, Detroit, Mich.

Application August 19, 1957, Serial No. 678,939

2 Claims. (Cl. 43—44.87)

This invention pertains to a fishing float or bobber and has particularly reference to a line-attaching device for such a float by means of which the float may be secured to a fishing line.

The present invention contemplates a wire clip adapted to be secured to a float body and formed outwardly of the body in such a manner that the position of the float along the line to which it is to be secured may be readily adjusted and the clip thereafter may be detachably secured to the line.

A principal object of the invention is to provide a novel line-attaching clip for a fishing float.

Another object of the invention is to provide a fishing float having an improved means thereon for attaching the float to a fishing line.

Other and further objects of the invention will be apparent from the following description and claims and may be understood by reference to the accompanying drawings, of which there is one sheet, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a side elevational view of a fishing float provided with the line-attaching device of the present invention;

Fig. 2 is an end elevational view of the float;

Fig. 3 is a fragmentary bottom plan view; and

Fig. 4 is a fragmentary side elevational view similar to Fig. 1 and illustrating the adjustment of the float along the line.

The float body 10 illustrated in the drawings may be similar to that disclosed and claimed in my copending application, Serial No. 672,445, filed July 17, 1957, for "Fishing Float." The present invention is directed to an improved line-attaching means 12 for use with such a float, although it will be appreciated as the description proceeds that the line-attaching means forming the subject matter of this application may be useful with other types of fishing floats or bobbers.

The line-attaching device 12 comprises a wire having an end 14 provided with a hook 16 which is inserted into a recess 18 formed in one end of the float body 10. The float may be made of any suitable material such as plastic, and the sharp edge of the hook portion 16 is adapted to bite into the material of the float body if an attempt is made to pull the clip 12 out of the recess 18 to securely fasten the clip to the float body.

The clip 12 extends outwardly from the float 10 and includes a straight portion 20. The wire is then bent back upon itself to define a loop 22 and a return run 24 extending alongside the straight portion 20. The return run 24 diverges away from the straight portion 20 to a slight extent and then is provided with a bend 26 which engages the straight portion 20. The return run 24 and the straight portion 20 of the clip 12 between the bend 26 and the loop 22 define a wedging portion within which the fishing line 28 may be firmly wedged, as shown in Fig. 1, to secure the float to the line.

The return run 24 inwardly toward the float body from the bend 26 extends away from and then back across the straight portion 20 to define a second loop 30, the end 32 of the clip 12 engaging the straight portion 20. The return run is spaced from the straight portion of the wire in the wedging section a distance less than the thickness of the line to which the device is to be attached so as to securely fasten the device to the line. The wire has some degree of resiliency so that the line may be slid out of the wedging section of the clip, either into loop 22 or into the loop 30, and the line may thereafter be forced back into the wedging portion to secure the float to the line.

As shown in Fig. 1 and as is conventional in the art, the end of the line 28 is provided with a suitable sinker 40 and a leader 42 to which a fishing hook or other lure is attached. The float may be secured to the line by forcing the line past the point of engagement between the end 32 and the straight portion 20 of the clip and then past the bend 26 into the wedging section. When the line is disposed in the loop 22, as shown in Fig. 4, or in loop 30, the float may be slid freely along the line to adjust the position of the float on the line.

The float body 10 may include a spool portion in the form of a longitudinal rib 44 about which that portion of the line between the clip 12 and the sinker 40 may be wound to facilitate casting operations of the tackle as disclosed and claimed in the aforesaid copending application.

It will be seen that the line-attaching clip described herein is extremely simple in construction and economical to manufacture and greatly facilitates attachment of the float to the line.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In a fishing float, a line-attaching clip comprising a wire having one end secured to said float and projecting outwardly therefrom, said wire having a straight portion which is bent back upon itself to define a loop and a return run extending alongside said straight portion, said return run engaging said straight portion at a point spaced inwardly from said loop, said return run between said point of engagement and said loop being spaced from said straight portion a distance less than the thickness of the line to which the float is to be attached to define a wedging portion wherein the line may be wedged to secure the float to the line, said wire extending from said point of engagement away from and then back across said straight portion in engagement therewith.

2. A float according to claim 1 wherein said clip is freely slidable along said line when the line is disposed in said loop or between said two points of engagement.

References Cited in the file of this patent

UNITED STATES PATENTS

| | | |
|---|---|---|
| 1,542,706 | Lang | June 16, 1925 |
| 1,778,119 | Neville | Oct. 14, 1930 |
| 2,189,963 | Schoneberger | Feb. 13, 1940 |